(«12») United States Patent
Seo et al.

(10) Patent No.: US 8,013,573 B2
(45) Date of Patent: Sep. 6, 2011

(54) BATTERY PACK THAT PROVIDES PRECISE VOLTAGE MEASUREMENTS OF BATTERIES WHEN SAFETY SWITCH IS PRESENT

(75) Inventors: Se-Wook Seo, Suwon-si (KR); Young-Jo Lee, Suwon-si (KR); Yong-Jun Tae, Suwon-si (KR); Han-Seok Yun, Suwon-si (KR); Gye-Jong Lim, Suwon-si (KR); Beom-Gyu Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 692 days.

(21) Appl. No.: 12/076,426

(22) Filed: Mar. 18, 2008

(65) Prior Publication Data

US 2008/0231232 A1    Sep. 25, 2008

(30) Foreign Application Priority Data

Mar. 19, 2007  (KR) .................. 10-2007-0026664

(51) Int. Cl.
*H01M 10/46*  (2006.01)
(52) U.S. Cl. ..................................... 320/116
(58) Field of Classification Search ............... 320/107, 320/112, 114, 116, 118, 119, 120
See application file for complete search history.

(56) References Cited

U.S. PATENT DOCUMENTS

| | | |
|---|---|---|
| 5,153,496 A | 10/1992 | LaForge |
| 5,321,627 A | 6/1994 | Reher |
| 5,666,040 A | 9/1997 | Bourbeau |
| 5,701,068 A | 12/1997 | Baer et al. |
| 5,773,959 A | 6/1998 | Merritt et al. |
| 5,773,962 A | 6/1998 | Nor |
| 5,796,334 A | 8/1998 | Chen et al. |
| 5,952,815 A | 9/1999 | Rouillard et al. |
| 6,014,013 A | 1/2000 | Suppanz et al. |
| 6,078,165 A | 6/2000 | Ashtiani et al. |

(Continued)

FOREIGN PATENT DOCUMENTS

CN    1415973    5/2003

(Continued)

OTHER PUBLICATIONS

Korean Notice of Allowability issued on Dec. 10, 2008 in the corresponding Korean Patent Application No. 10-2007-0026664.

(Continued)

*Primary Examiner* — Edward Tso
(74) *Attorney, Agent, or Firm* — Robert E. Bushnell, Esq.

(57) ABSTRACT

A battery pack is constructed with a plurality of secondary batteries or a plurality of battery assemblies, each having a plurality of unit batteries, and at least one safety switch, which can facilitate precise measurement of the voltages of the plurality of secondary batteries or battery assemblies. The battery pack is constructed with a plurality of secondary batteries, at least one safety switch electrically connected between two adjacent batteries among the plurality of secondary batteries, and a plurality of sensing lines for measuring voltages of the plurality of secondary batteries. The quantity of the sensing lines is equals to a sum of the number of the secondary batteries, and the number of the safety switches, and plus one.

23 Claims, 3 Drawing Sheets

U.S. PATENT DOCUMENTS

| | | | |
|---|---|---|---|
| 6,104,166 A | 8/2000 | Kikuchi et al. | |
| 6,127,806 A | 10/2000 | Tanjo et al. | |
| 6,157,169 A | 12/2000 | Lee | |
| 6,255,826 B1 | 7/2001 | Ohsawa et al. | |
| 6,300,763 B1 | 10/2001 | Kwok | |
| 6,326,767 B1* | 12/2001 | Small et al. | 320/116 |
| 6,336,063 B1 | 1/2002 | Lennevi | |
| 6,377,030 B1 | 4/2002 | Asao et al. | |
| 6,411,063 B1 | 6/2002 | Kouzu et al. | |
| 6,472,880 B1 | 10/2002 | Kang | |
| 6,531,874 B2 | 3/2003 | Mentgen et al. | |
| 6,621,250 B1 | 9/2003 | Ohkubo et al. | |
| 6,639,409 B2 | 10/2003 | Morimoto et al. | |
| 6,803,766 B2 | 10/2004 | Kobayashi et al. | |
| 7,126,342 B2 | 10/2006 | Iwabuchi et al. | |
| 2001/0035737 A1 | 11/2001 | Nakanishi et al. | |
| 2002/0030494 A1 | 3/2002 | Araki et al. | |
| 2002/0113595 A1 | 8/2002 | Sakai et al. | |
| 2003/0025481 A1 | 2/2003 | Bertness | |
| 2003/0146737 A1 | 8/2003 | Kadouchi et al. | |
| 2003/0189419 A1 | 10/2003 | Maki et al. | |
| 2004/0109274 A1 | 6/2004 | Sato | |
| 2005/0156603 A1 | 7/2005 | Lin et al. | |
| 2006/0028179 A1 | 2/2006 | Yudahira et al. | |
| 2006/0181245 A1 | 8/2006 | Mizuno et al. | |
| 2006/0202663 A1 | 9/2006 | Cho et al. | |
| 2007/0090798 A1* | 4/2007 | Yun et al. | 320/116 |
| 2007/0090802 A1 | 4/2007 | Seo | |
| 2007/0090803 A1 | 4/2007 | Yun et al. | |
| 2008/0077339 A1 | 3/2008 | Seo et al. | |
| 2008/0091364 A1 | 4/2008 | Lim et al. | |

FOREIGN PATENT DOCUMENTS

| | | |
|---|---|---|
| CN | 1604383 | 4/2005 |
| CN | 1790857 | 6/2006 |
| DE | 100 56 971 A1 | 5/2002 |
| EP | 0 990 913 | 4/2000 |
| EP | 1 081 499 | 3/2001 |
| EP | 1 203 964 | 5/2002 |
| EP | 1 271 171 A2 | 1/2003 |
| EP | 1 314 992 A2 | 5/2003 |
| EP | 1 555 537 A1 | 7/2005 |
| EP | 1 841 003 | 10/2007 |
| JP | 06-231806 | 8/1994 |
| JP | 11-160367 | 6/1999 |
| JP | 2000-069606 | 3/2000 |
| JP | 2000-134705 | 5/2000 |
| JP | 2000-217261 | 8/2000 |
| JP | 2000-228832 | 8/2000 |
| JP | 2000-324702 | 11/2000 |
| JP | 2000-340267 | 12/2000 |
| JP | 2000-357541 | 12/2000 |
| JP | 2001-086656 | 3/2001 |
| JP | 2001-116776 | 4/2001 |
| JP | 2001-126685 A | 5/2001 |
| JP | 2002-042906 | 2/2002 |
| JP | 2002-199510 | 7/2002 |
| JP | 2003-084015 | 3/2003 |
| JP | 2003-134675 | 5/2003 |
| JP | 2004-079324 | 3/2004 |
| JP | 2004-180397 | 6/2004 |
| JP | 2004-222433 | 8/2004 |
| JP | 2005-269752 | 9/2005 |
| JP | 2005-285458 A | 10/2005 |
| JP | 2005-285459 A | 10/2005 |
| JP | 2006-014480 | 1/2006 |
| JP | 2006-047130 | 2/2006 |
| KR | 10-1992-0009697 | 10/1992 |
| KR | 10-1997-0048597 | 7/1997 |
| KR | 1998-064646 | 7/1998 |
| KR | 10-0216808 | 6/1999 |
| KR | 10-2001-0043872 | 5/2001 |
| KR | 10-2001-0107687 | 12/2001 |
| KR | 10-2002-0064998 | 8/2002 |
| KR | 2003-0065757 | 8/2003 |
| KR | 10-2004-0005133 | 1/2004 |
| KR | 10-2004-0092943 | 11/2004 |
| KR | 10-2004-0111144 | 12/2004 |
| KR | 10-2005-0019856 | 3/2005 |
| KR | 10-2005-0026360 | 3/2005 |
| KR | 10-2005-0089816 | 9/2005 |
| KR | 10-2006-0059680 | 6/2006 |
| KR | 10-2006-0079505 | 7/2006 |
| KR | 10-2006-0094897 | 8/2006 |
| KR | 10-2007-0003628 | 1/2007 |
| KR | 10-2007-0029937 | 3/2007 |
| WO | WO 2007/007655 | 1/2007 |

OTHER PUBLICATIONS

Chinese Office Action with the English translation issued on Jun. 19, 2009 in the corresponding Chinese Patent Application No. 200810082790.7.

European Search Report dated Apr. 7, 2008 in the corresponding European Patent Application No. 08102707.0.

Korean Office Action dated Jun. 30, 2008 in the corresponding Korean Patent Application No. 2007-0026664.

State of charge http://en.eikipedia.org/wiki/State_of_charge.

Custom Power Solutions http://www.mpoweruk.com/soc.htm.

European Office Action issued by European Patent Office on Jan. 7, 2011.

Chinese Decision of Rejection and its English translation issued on Apr. 1, 2011 in corresponding Chinese Patent Application No. 200810082790.7.

Japanese Office Action issued on Jun. 7, 2011 in the corresponding Japanese Patent Application No. 2007-216166.

* cited by examiner

BATTERY PACK THAT PROVIDES PRECISE VOLTAGE MEASUREMENTS OF BATTERIES WHEN SAFETY SWITCH IS PRESENT

CLAIM OF PRIORITY

This application makes reference to, incorporates the same herein, and claims all benefits accruing under 35 U.S.C. §119 from an application for BATTERY PACK earlier filed in the Korean Intellectual Property Office on 19 Mar. 2007 and there duly assigned Serial No. 10-2007-0026664.

BACKGROUND OF THE INVENTION

1. Field of the Invention

The present invention relates to a battery pack, and more particularly, to a battery pack comprising a plurality of secondary batteries or a plurality of battery assemblies, each battery assembly including a plurality of unit batteries, and at least one safety switch, which is capable of providing a precise measurement of the voltages of the plurality of secondary batteries or battery assemblies.

2. Description of the Related Art

Recently, as compact and lightweight portable electronic or electrical appliances such as cellular phones, notebook computers and camcorders are actively developed and produced, these portable electronic or electrical appliances are typically accompanied by a battery pack intended to provide electrical power to the appliance in any place even without a separate power supply. Generally, a battery pack uses a chargeable and dischargeable secondary battery, which may be one of a nickel-cadmium (Ni—Cd) battery, a nickel-hydrogen (Ni-MH) battery or a lithium (Li) battery, in consideration of economical aspects.

The Li secondary battery is widely applied to the portable appliances because Li secondary battery has an operating voltage which is three times higher than other batteries (Ni—Cd and Ni-MH batteries), and a high energy density per unit weight. The Li secondary battery is classified into a Li ion battery using an aqueous electrolyte and a Li polymer battery using a polymer electrolyte formed on the electrolyte. The Li secondary battery may also be classified into cylindrical, prismatic and pouch batteries based on the shape.

Since a single secondary battery cannot provide a sufficient voltage or capacity to portable electronic or electrical appliances that are intended to operate for a long period of time, a plurality of secondary batteries or a plurality of battery assemblies, each battery assembly including a plurality of unit batteries, are electrically connected in series or parallel to constitute a battery pack.

Such a battery pack that is constructed with the plurality of secondary batteries or the plurality of battery assemblies, each battery assembly including the unit batteries, is repeatedly charged and discharged for several times, and each of the secondary batteries or unit batteries is charged with a different energy level. That is, since the plurality of secondary batteries or unit batteries are discharged to different energy levels, when recharged, the secondary battery or unit battery having relatively higher energy may be completely charged within a shorter time than that having relatively lower energy. Similarly, a battery having relatively lower energy starts to be discharged even when the battery has been incompletely charged. Therefore, the battery having relatively lower energy may be undesirably over discharged and become damaged due to repetitive incomplete charging and over-discharging.

To solve these problems, a battery pack that is constructed with a plurality of secondary batteries or a plurality of battery assemblies is typically constructed with a battery management system (BMS) which measures the voltage of each of the secondary batteries or battery assemblies to control charging and discharging operations of the secondary batteries or battery assemblies.

Generally, a contemporary battery pack may be constructed with a plurality of secondary batteries or a plurality of battery assemblies, each battery assembly including a plurality of unit batteries, a plurality of sensing lines, and a battery management system electrically connected with the sensing lines to measure the voltages of the plurality of secondary batteries or battery assemblies, and to control charging and discharging operations of the plurality of secondary batteries or battery assemblies.

Each of the plurality of sensing lines is electrically connected to a node located between two adjacent secondary batteries or battery assemblies. Therefore, the minimum quantity of the sensing lines for measuring the voltages of the secondary batteries or battery assemblies equals to the number of secondary batteries or battery assemblies plus one.

The contemporary battery pack may also be constructed with a safety switch which is electrically connected between the plurality of secondary batteries or battery assemblies in order to block an electrically current flowing through the plurality of secondary batteries or battery assemblies due to a breakdown of the battery pack. This battery pack has a problem, however, that the exact voltages of the secondary batteries or battery assemblies that are directly connected to the safety switch may not be precisely measured.

SUMMARY OF THE INVENTION

It is therefore an object of the present invention to provide an improved battery pack.

It is another object to provide a battery pack which can precisely measure the voltage across each of a plurality of secondary batteries or a plurality of battery assemblies, even when at least one safety switch is formed between the plurality of secondary batteries or the plurality of battery assemblies, each battery assembly including a plurality of unit batteries.

According to an aspect of the present invention, the battery pack may be constructed with a plurality of secondary batteries, at least one safety switch electrically connected between two adjacent batteries among the plurality of secondary batteries, and a plurality of sensing lines connected to both ends of the plurality of secondary batteries for measuring voltages of the plurality of secondary batteries. The quantity of the sensing lines may equal to a sum of the number of the secondary batteries, and the number of the safety switches, and plus one.

According to another aspect of the present invention, the battery pack may be constructed with a plurality of battery assemblies, each including a plurality of unit batteries, at least one safety switch electrically connected between two adjacent assemblies among the plurality of battery assemblies, and a plurality of sensing lines connected to both ends of the plurality of battery assemblies for measuring voltages of the plurality of battery assemblies. The quantity of the sensing lines may equal to a sum of the number of the battery assemblies, and the number of the safety switches, and plus one.

According to still another aspect of the present invention, the battery pack may be constructed with a plurality of secondary batteries, at least one safety switch electrically connected between two adjacent batteries among the plurality of secondary batteries, and a first sensing line electrically connected to one end of the safety switch.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
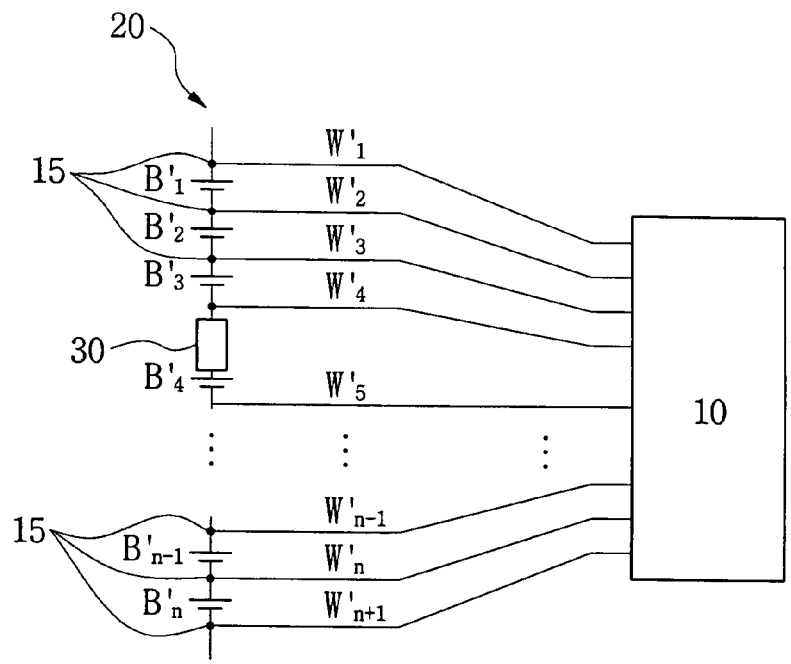
FIG. 1 is a simplified diagram of a partial circuit for a contemporary battery pack.

The detailed matters about the objects, technical features and effects of the present invention will be more fully understood by the following detailed description with respect to the drawings illustrating exemplary embodiments of the present invention. In the drawings, the thickness of layers and nodes may be exaggerated for clarity. Like elements are denoted by like reference numerals throughout the drawings. When one part is "connected" to another part, it may be "directly connected" to each other, or "electrically connected" at both sides of another device.

Referring now to FIG. 1, a contemporary battery pack 20 may be constructed with n secondary batteries or n battery assemblies $B'_1$~$B'_n$, each battery assembly including a plurality of unit batteries, n+1 sensing lines $W'_1$~$W'_{n+1}$, and a battery management system 10 electrically connected with n+1 sensing lines $W'_1$~$W'_{n+1}$ to measure the voltages of n secondary batteries or battery assemblies $B'_1$~$B'_s$, and to control charging and discharging operations of n secondary batteries or battery assemblies $B'_1$~$B'_n$. Here, n is a positive integer.

Battery pack 20 requires n+1 sensing lines $W'_1$~$W'_{n+1}$ to minimize necessary sensing lines for measuring the voltages of n secondary batteries or battery assemblies $B'_1$~$B'_n$ because sensing lines $W'_1$~$W'_{n+1}$ are connected to nodes 15 located between each pair of two adjacent secondary batteries or battery assemblies from among n secondary batteries or battery assemblies $B'_1$~$B'_n$.

Battery pack 20 may be constructed with at least one safety switch 30 to block an electrical current flowing through n secondary batteries or battery assemblies $B'_1$~$B'_n$ due to a breakdown of battery pack 20. Safety switch 30 is located between two adjacent secondary batteries $B'_3$ and $B'_4$. Battery pack 20 which is constructed with safety switch 30 has a problem that the exact voltages of secondary batteries $B'_3$ and $B'_4$ that are directly connected to safety switch 30 may not be precisely measured.

First Exemplary Embodiment

Figure 2A:
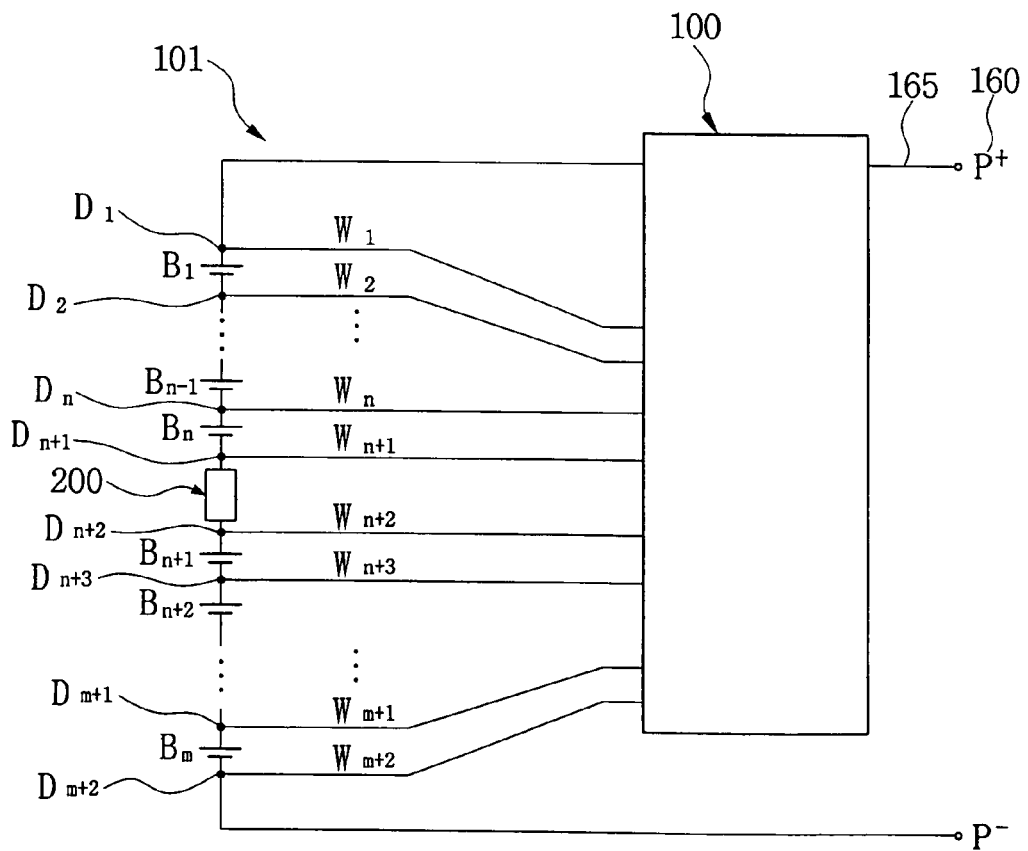
FIG. 2A is a simplified diagram of a partial circuit for a battery pack constructed as a first exemplary embodiment according to the principles of the present invention.
Figure 2B:
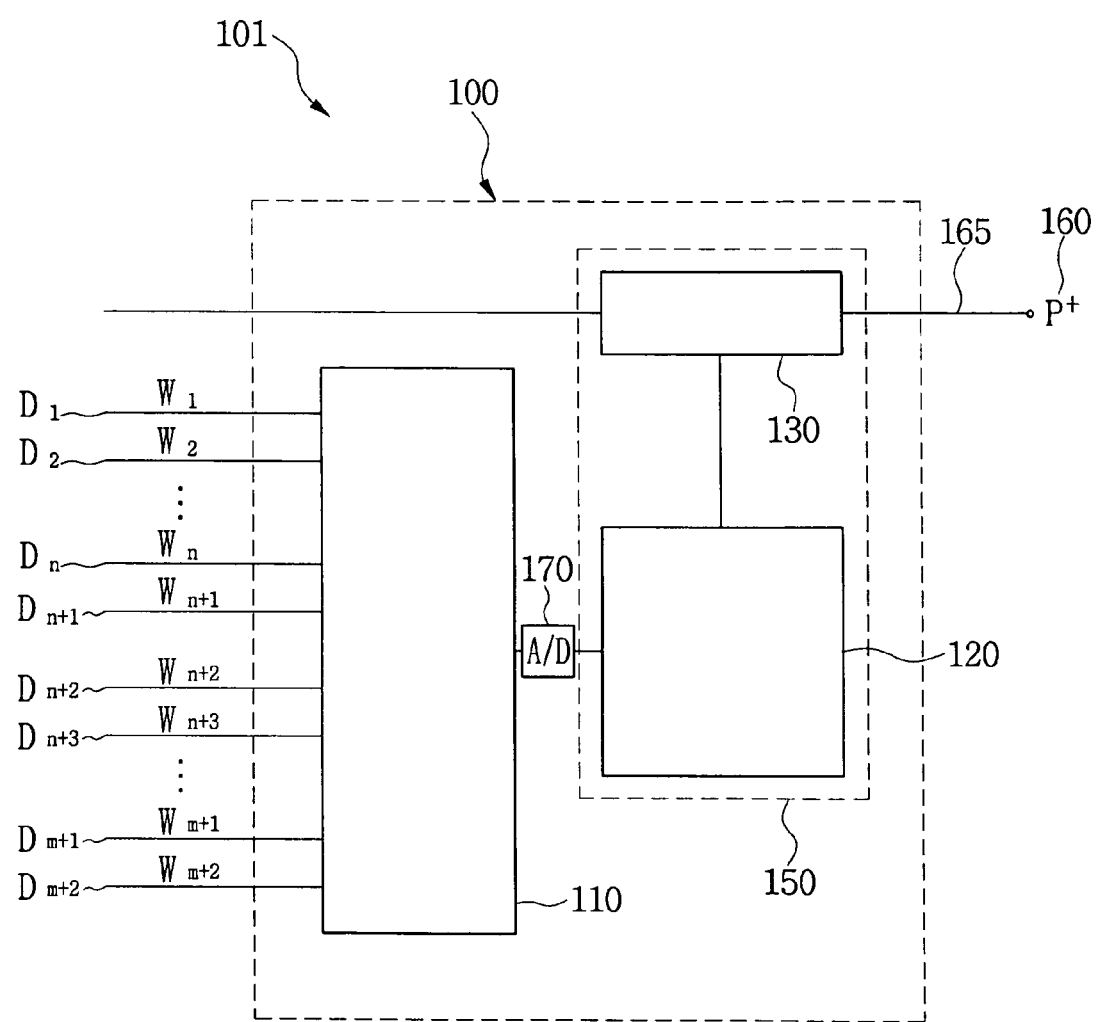
FIG. 2B is a diagram of circuit for a battery management system of the battery pack constructed as the first exemplary embodiment according to the principles of the present invention.

FIG. 2A is a partial circuit diagram of a battery pack constructed as a first exemplary embodiment according to the principles of the present invention, and FIG. 2B is a circuit diagram of a battery management system of the battery pack constructed as the first exemplary embodiment according to the principles of the present invention.

Referring to FIGS. 2A and 2B, battery pack 101 according to the first exemplary embodiment of the present invention is constructed with m secondary batteries $B_1$~$B_m$, a safety switch 200 connected between secondary battery $B_n$ and secondary battery $B_{n+1}$, a battery management system 100 electrically connected to m secondary batteries $B_1$~$B_m$, and sensing lines $W_1$~$W_{m+2}$ electrically connected between battery management system 100 and both ends of m secondary batteries $B_1$~$B_m$. Specifically, safety switch 200 is electrically coupled in series between electrically opposite poles of batteries $B_n$ and $B_{n+1}$, and the corresponding nodes formed by lines $W_{n+1}$ and $W_{n+2}$. Sensing lines $W_1$~$W_{m+2}$ include sensing lines $W_1$ and $W_{m+2}$, each being electrically connected to a corresponding node $D_1$ or $D_{m+2}$ located at one end of secondary battery $B_n$ or $B_{n+1}$ where secondary battery $B_n$ or $B_{n+1}$ is not electrically connected with any other secondary batteries; sensing lines $W_2$~$W_n$ and $W_{n+3}$~$W_{m+1}$, each being electrically connected to a corresponding node among $D_2$~$D_n$ and $D_{n+3}$~$D_{m+1}$ located between two adjacent secondary batteries $B_1$~$B_m$; and sensing lines $W_{n+1}$ and $W_{n+2}$, each being electrically connected to a corresponding node $D_{n+1}$ or $D_{n+2}$ located between secondary battery $B_n$ or $B_{n+1}$ and safety switch 200. Here, n and m are positive integers, and 0<n<n+1≦m.

m secondary batteries $B_1$~$B_m$ may be electrically connected in series as illustrated in FIG. 2A, or electrically connected in parallel.

In addition, a battery separator (not illustrated) may be disposed between at least one pair secondary batteries among m secondary batteries $B_1$~$B_m$, in order to maintain a regular space between each pair of secondary batteries among m secondary batteries $B_1$~$B_m$. The battery separator may be made from an insulating material in order to prevent a short circuit between m secondary batteries $B_1$~$B_m$.

Battery management system 100 is constructed with at least one battery voltage measuring unit 110 which is electrically connected with sensing lines $W_1$~$W_{m+2}$ and measures a voltage of each of m secondary batteries $B_1$~$B_m$, and a control unit 150 controlling charging and discharging operations of m secondary batteries $B_1$~$B_m$ in dependence upon the voltages of m secondary batteries $B_1$~$B_m$ measured by battery voltage measuring unit 110. Control unit 150 is constructed with a control signal generation unit 120 generating a control signal in dependence upon the measured voltages of m secondary batteries $B_1$~$B_m$, and a switching unit 130 blocking an external terminal (the external terminal may be a positive electrode terminal 160 as shown in FIG. 2B in the first embodiment of the present invention) from m secondary batteries $B_1$~$B_m$ in dependence upon the control signal. In addition, for easy construction and fast processing rate of control unit 150, an analog-digital converting unit 170 may be disposed between battery voltage measuring unit 110 and control unit 150, which may convert the voltages of m secondary batteries $B_1$~$B_m$ measured by battery voltage measuring unit 110 into digital signals to be transmitted to control unit 150.

Battery voltage measuring unit 110 measures the voltage of each secondary battery among m secondary batteries $B_1$~$B_m$ through sensing lines $W_1$~$W_{m+2}$, and transmits the measured voltages to control unit 150. Although battery packet 101 constructed as the first exemplary embodiment according to the principles of the present invention has one battery voltage measuring unit 110, several battery voltage measuring units 110 may be formed to correspond to m secondary batteries, if necessary.

Control unit 150 prevents m secondary batteries from being over charged or discharged by generating control signals using control signal generation unit 120 in dependence upon the measured voltages of m secondary batteries $B_1 \sim B_m$ transmitted from battery voltage control unit 110, and blocks an electrical current flowing between m secondary batteries $B_1 \sim B_m$ and external terminal 160 in dependence upon the control signals in order to control the charging and discharging operations of m secondary batteries $B_1 \sim B_m$ through switching unit 130. To be specific, control signal generation unit 120 compares the voltage of each secondary battery of m secondary batteries $B_1 \sim B_m$ measured by battery voltage measuring unit 110 with certain values defining a certain range. When the voltage is out of the certain range, control signal generation unit 120 generates control signals to stop the charging or discharging operations of m secondary batteries $B_1 \sim B_m$ and applies the control signals to switching unit 130. Then, switching unit 130 turns off a switching device (not shown) electrically connected to a high current line 165 electrically connecting m secondary batteries $B_1 \sim B_m$ with external terminal 160 in response to the control signals, so as to prevent m secondary batteries $B_1 \sim B_m$ from being over charged or discharged.

Alternatively, to simplify the construction of control unit 150, battery voltage measuring unit 110 may be constructed with several relays (not illustrated), a battery voltage transmitting unit (not illustrated), a charging unit (not illustrated), a charge voltage transmitting unit (not illustrated) and a discharging unit (not illustrated).

Sensing lines $W_1 \sim W_{m+2}$ are electrically connected between m secondary batteries $B_1 \sim B_m$ and battery voltage measuring unit 110 to facilitate a measurement of voltages of m secondary batteries $B_1 \sim B_m$ by battery voltage measuring unit 110. Battery voltage measuring unit 110 is electrically connected through sensing lines $W_1 \sim W_{m+2}$ with nodes between each of m secondary batteries $B_1 \sim B_m$ in order to minimize a quantity of sensing lines $W_1 \sim W_{m+2}$. Therefore, a measurement of the voltages of two adjacent secondary batteries may only require three sensing lines.

To be more specific, sensing line $W_{n+1}$ is electrically connected to node $D_{n+1}$ located between safety switch 200 and secondary battery $B_n$, and sensing line $W_{n+2}$ is electrically connected to node $D_{n+2}$ located between safety switch 200 and secondary battery $B_{n+1}$, in order to facilitate a precise measurement of a voltage across secondary battery $B_n$ or a voltage across secondary battery $B_{n+1}$. Specifically, battery voltage measuring unit 110 uses a voltage transmitted through sensing line $W_n$ which is electrically connected to node $D_n$ located between secondary battery $B_n$ and secondary battery $B_{n-1}$, and a voltage transmitted through sensing line $W_{n+1}$ which is electrically connected to node $D_{n+1}$ located between secondary battery $B_n$ and safety switch 200, to measure the voltage across secondary battery $B_n$. Similarly, battery voltage measuring unit 110 uses a voltage transmitted through sensing line $W_{n+2}$ which is electrically connected to node $D_{n+2}$ located between secondary battery $B_{n+1}$ and safety switch 200, and a voltage transmitted through sensing line $W_{n+3}$ which is electrically connected to node $D_{n+3}$ located between secondary battery $B_{n+1}$ and secondary battery $B_{n+2}$, to measure the voltage across secondary battery $B_{n+1}$.

As a result, battery pack 101 constructed as the first exemplary embodiment according to the principles of the present invention electrically connects sensing line $W_{n+1}$ and sensing line $W_{n+2}$ to both ends of safety switch 200 which is electrically connected between secondary batteries $B_n$ and $B_{n+1}$, thereby precisely measuring voltages across secondary batteries $B_n$ and $B_{n+1}$ which are electrically connected to safety switch 200.

Second Exemplary Embodiment

Figure 3:
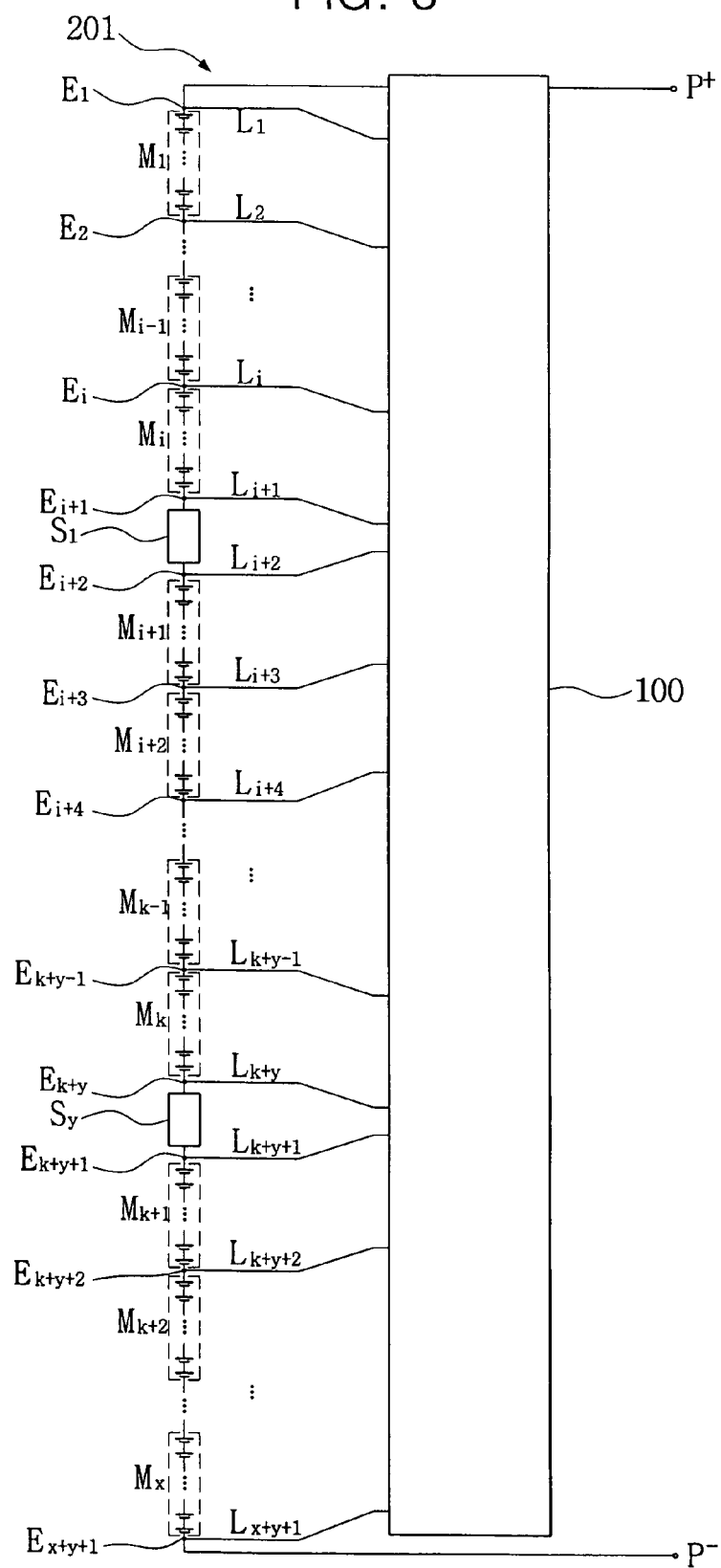
FIG. 3 is a simplified diagram of a partial circuit for a battery pack constructed as a second exemplary embodiment according to the principles of the present invention.

FIG. 3 is a partial circuit diagram of a battery pack constructed as a second exemplary embodiment according to the principles of the present invention.

Referring to FIG. 3, battery pack 201 according to the second exemplary embodiment of the principles of the present invention is constructed with x battery assemblies $M_1 \sim M_x$, each battery assembly including a plurality of unit batteries 210, y safety switches $S_1 \sim S_y$ electrically connected between at least one selected pair of adjacent battery assemblies among x battery assemblies $M_1 \sim M_x$, a battery management system 100 electrically connected to x battery assemblies $M_1 \sim M_x$, and sensing lines $L_i \sim L_{x+y+1}$, each being electrically connected between battery management system 100 and a corresponding end of each of x battery assemblies $M_1 \sim M_x$. That is, sensing lines $L_1 \sim L_{x+y+1}$, include sensing lines $L_2 \sim L_i$ and $L_{k+y+2} \sim L_{x+y}$, each being electrically connected between battery management system 100 and a corresponding node from among nodes $E_2 \sim E_i$ and $E_{k+y+2} \sim E_{x+y}$; sensing lines $L_{i+1}$, $L_{i+2}$, $L_{k+y}$, $L_{k+y+1}$, each being electrically connected between battery management system 100 and a corresponding node from among nodes $E_{i+1}$, $E_{i+2}$, $E_{k+y}$, $E_{k+y+1}$ respectively located between battery assembly $M_i$ and safety switch $S_1$, between battery assembly $M_{i+1}$ and safety switch $S_1$, between battery assembly $M_k$ and safety switch $S_y$, and between battery assembly $M_k$ and safety switch $S_k$; and sensing lines $L_1$ and $L_{x+y+1}$, each being electrically connected between battery management system 100 and a corresponding node $E_1$ or $E_{i+2}$ where battery assembly $M_1$ or $M_x$ is not electrically connected to any other battery assembly. Here, x and y are positive integers. The plurality of unit batteries 210 included in each of x battery assemblies $M_1 \sim M_x$ may be a plurality of secondary batteries. Also, battery management system 100 may be the same as that described in the first exemplary embodiment of the present invention illustrated in FIGS. 2A and 2B, so battery management system 100 will not be described here.

x battery assemblies $M_1 \sim M_x$ and unit batteries 210 included in each of x battery assemblies $M_1 \sim M_x$ may be electrically connected in series as illustrated in the drawing. Alternatively, x battery assemblies $M_1 \sim M_x$ and unit batteries 210 included in each of x battery assemblies $M_1 \sim M_x$ may be electrically connected in parallel, or any one of x battery assemblies $M_1 \sim M_x$ or unit batteries 210 may be electrically connected in series with the rest of x battery assemblies $M_1 \sim M_x$ or unit batteries 210, while the rest being electrically connected in parallel. Also, battery separators (not illustrated) may be disposed between unit batteries 210 included in each of x battery assemblies $M_1 \sim M_x$ and at an outer side of unit batteries 210 to maintain a regular space between the plurality of unit batteries and to support a side surface. And, the battery separator may be made from an insulating material in order to prevent a short circuit between the plurality of unit batteries.

More specifically, sensing line $L_{i+1}$ is electrically connected to node $E_{i+1}$ located between safety switch $S_1$ and battery assembly $M_i$, and sensing line $L_{i+2}$ is electrically connected to node $E_{i+2}$ located between safety switch $S_1$ and battery assembly $M_{i+1}$. Here, i is a positive integer which is smaller than x. Battery management system 100 uses a voltage transmitted through sensing line $L_i$ which is electrically connected to node $E_i$ located between battery assembly $M_i$ and battery assembly $M_{i-1}$, and a voltage transmitted through sensing line $L_{i+1}$, which is electrically connected to node $E_{i+1}$ located between battery assembly $M_i$ and safety switch $S_1$, in order to measure a voltage across battery assembly $M_i$. Similarly, battery management system 100 uses a voltage transmitted through sensing line $L_{i+2}$ which is electrically connected to node $E_{i+2}$ located between battery assembly $M_{i+1}$ and safety switch $S_1$, and a voltage transmitted through sensing line $L_{i+3}$ which is electrically connected to node $E_{i+3}$ located between battery assembly $M_{i+1}$ and battery assembly $M_{i+2}$, in order to measure a voltage across battery assembly $M_{i+1}$.

Next, sensing line $L_{k+y}$ is electrically connected to node $E_{k+y}$ located between safety switch $S_y$ and battery assembly $M_k$, and sensing line $L_{k+y+1}$ is electrically connected to node $E_{k+y+1}$ located between switch $S_y$ and battery assembly $M_{k+1}$. Here, k is a positive integer and i<k<x. As descried above, battery management system 100 uses a voltage transmitted through sensing line $L_{k+y-1}$ which is electrically connected to node $E_{k+y-1}$ located between battery assembly $M_k$ and battery assembly $M_{k-1}$, and a voltage transmitted through sensing line $L_{k+y}$ which is electrically connected to node $E_{k+y}$ located between battery assembly $M_k$ and safety switch $S_y$, in order to measure a voltage across battery assembly $M_k$. Similarly, battery management system 100 uses a voltage transmitted through sensing line $L_{k+y+1}$ which is electrically connected to node $E_{k+y+1}$ located between battery assembly $M_{k+1}$ and safety switch $S_y$, and a voltage transmitted through sensing line $L_{k+y+2}$ which is electrically connected to node $E_{k+y+2}$ located between battery assembly $M_{k+1}$ and battery assembly $M_{k+2}$, in order to measure a voltage across battery assembly $M_{k+1}$.

Therefore, battery pack 201 constructed as the second exemplary embodiment according to the principles of the present invention prevents measurement error of the voltages of the battery assemblies that are directly electrically connected to safety switches $S_1 \sim S_y$, by electrically connecting some of sensing lines $L_1 \sim L_{x+y+1}$ to a corresponding end of y safety switches $S_1 \sim S_y$. Thus, the quantity of sensing lines $L_1 \sim L_{x+y+1}$ becomes x+y+1, which equals to a sum of x (i.e., the quantity of battery assemblies $M_1 \sim M_x$), and y (i.e., the quantity of safety switches $S_1 \sim S_y$), and plus 1.

As a result, battery pack 201 constructed as the second exemplary embodiment according to the principles of the present invention may precisely measure voltages of a plurality of battery assemblies with the minimum quantity of sensing lines by electrically connecting a plurality of sensing lines to both ends of a plurality of safety switches that are electrically connected between a plurality of battery assemblies, each battery assembly including a plurality of unit batteries, and the quantity of the sensing lines equals to a sum of the number of the battery assemblies, and the number of the safety switches, and plus 1.

A battery pack according to the present invention may precisely measure voltages of a plurality of secondary batteries or a plurality of battery assemblies using the minimum quantity of sensing lines by electrically connecting sensing lines to both ends of at least one safety switch electrically connected between the plurality of secondary batteries or the plurality of battery assemblies including a plurality of unit batteries.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A battery pack, comprising:
   a plurality of secondary batteries;
   at least one safety switch electrically connected between electrically opposite poles of neighboring adjacent batteries among the plurality of secondary batteries; and
   a plurality of sensing lines electrically connected to electrically distinct ends of the plurality of secondary batteries to measure voltages of the plurality of secondary batteries, with the quantity of the sensing lines equaling a sum of the number of the secondary batteries, and the number of the safety switches, and plus one.

2. The battery pack according to claim 1, comprised of the plurality of secondary batteries being electrically connected in series.

3. The battery pack according to claim 1, comprised of the plurality of sensing lines being electrically connected to the nodes that are located between the plurality of secondary batteries, and that nodes that are located between the safety switch and the secondary batteries that are directly connected to the safety switch.

4. The battery pack according to claim 1, comprised of battery separators disposed between the plurality of secondary batteries.

5. The battery pack according to claim 4, comprised of the battery separators being made from an insulating material.

6. The battery pack according to claim 1, comprised of the plurality of sensing lines being electrically connected to a battery management system which measures voltages of the plurality of secondary batteries and controls charging and discharging operations of the plurality of secondary batteries.

7. The battery pack according to claim 6, comprised of the battery management system comprising at least one battery voltage measuring unit electrically connected to the sensing lines to measure the voltages of the plurality of secondary batteries, and a control unit controlling charging and discharging operations of the plurality of secondary batteries in dependence upon the measured voltages.

8. The battery pack according to claim 7, comprised of the control unit comprising a control signal generation unit generating a control signal in response to the measured voltages, and a switching unit blocking an external terminal from the plurality of secondary batteries in response to the control signal.

9. A battery pack, comprising:
   a plurality of battery assemblies, each battery assembly comprising a plurality of unit batteries;
   at least one safety switch electrically connected between electrically opposite poles of neighboring battery assemblies among the plurality of battery assemblies; and
   a plurality of sensing lines connected to electrically distinct ends of each of the plurality of battery assemblies to measure voltages of the plurality of battery assemblies, with the quantity of the sensing lines equaling a sum of the number of the battery assemblies, and the number of the safety switches, and plus one.

10. The battery pack according to claim 9, comprised of the plurality of battery assemblies being electrically connected in series.

11. The battery pack according to claim 9, comprised of the plurality of sensing lines being electrically connected to the nodes between the plurality of battery assemblies and the nodes located between the safe switch and the battery assemblies that are directly connected to the safe switch.

12. The battery pack according to claim 9, comprised of the plurality of sensing lines being electrically connected to a battery management system which measures the voltages of the plurality of battery assemblies and controls charging and discharging operations of the plurality of battery assemblies.

13. The battery pack according to claim 12, comprised of the battery management system comprising at least one battery voltage measuring unit electrically connected to the sensing lines to measure voltages of the plurality of battery assemblies, and a control unit controlling charging and discharging operations of the plurality of battery assemblies in dependence upon the measured voltages.

14. The battery pack according to claim 13, comprised of the control unit comprising a control signal generation unit generating a control signal in response to the measured voltage, and a switching unit blocking an external terminal from the plurality of battery assemblies in response to the control signal.

15. The battery pack according to claim 9, comprised of the plurality of battery assemblies output the same voltage.

16. The battery pack according to claim 9, comprised of battery separators disposed between the plurality of unit batteries.

17. The battery pack according to claim 16, comprised of the battery separators being made from an insulating material.

18. The battery pack according to claim 9, comprised of the plurality of unit batteries being electrically connected in series, and the plurality of battery assemblies being electrically connected in parallel.

19. A battery pack, comprising:
   a plurality of secondary batteries being divided into n battery assemblies, where n is a positive integer;
   at least one safety switch electrically connected between electrically opposite poles of neighboring batteries among the plurality of secondary batteries;
   a first sensing line electrically connected to one end of the safety switch; and
   a plurality of second sensing lines electrically connected to nodes located between the n battery assemblies.

20. The battery pack according to claim 19, with the sum of the first sensing line and the number of the second sensing lines equaling a sum of the number of the battery assemblies, and the number of the safety switches, and plus one.

21. The battery pack according to claim 20, further comprising:
   a battery management system electrically connected to the plurality of secondary batteries, and controlling charging and discharging operations of n battery assemblies by measuring the voltages of the plurality of secondary batteries.

22. The battery pack according to claim 21, comprised of the battery management system comprising at least one battery voltage measuring unit electrically connected to the first sensing line and second sensing lines to measure the voltages of the plurality of secondary batteries, and a control unit controlling charging and discharging operations of n battery assemblies in dependence upon the measured voltages.

23. The battery pack according to claim 22, comprised of the control unit comprising a control signal generation unit generating a control signal in response to the measured voltages, and a switching unit blocking an external terminal from the plurality of secondary batteries in response to the control signal.

* * * * *